United States Patent
Ebert et al.

(10) Patent No.: US 10,046,915 B2
(45) Date of Patent: Aug. 14, 2018

(54) TRANSPORTATION SYSTEM WITH MAGNETIC CLUTCH

(71) Applicant: Poly-clip System GmbH & Co. KG, Hattersheim (DE)

(72) Inventors: Detlef Ebert, Bad Nauheim (DE); Thorsten Würth, Kelkheim (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 15/496,542

(22) Filed: Apr. 25, 2017

(65) Prior Publication Data

US 2017/0305677 A1    Oct. 26, 2017

(30) Foreign Application Priority Data

Apr. 26, 2016    (EP) ..................... 16167168

(51) Int. Cl.
*B65G 23/26* (2006.01)
*F16D 27/12* (2006.01)
(Continued)

(52) U.S. Cl.
CPC ............ *B65G 23/26* (2013.01); *A22C 11/008* (2013.01); *B65G 15/00* (2013.01); *B65G 21/06* (2013.01);
(Continued)

(58) Field of Classification Search
CPC ........ B65G 15/28; B65G 23/18; G01G 11/00; G01G 15/00; G01G 21/30
(Continued)

(56) References Cited

U.S. PATENT DOCUMENTS

| 4,577,749 A | * | 3/1986 | Pentith | ................... | B65G 23/18 |
| | | | | | 198/805 |
| 5,388,526 A | * | 2/1995 | Imai | ..................... | B65G 54/025 |
| | | | | | 104/118 |

(Continued)

FOREIGN PATENT DOCUMENTS

| DE | 10203457 A1 | 7/2003 |
| EP | 1744636 A1 | 1/2007 |
| WO | 2012/028879 A1 | 3/2012 |

OTHER PUBLICATIONS

Extended European search report issued in corresponding European Application No. 16167168.0 dated Oct. 10, 2016 (9 pages).

*Primary Examiner* — Douglas A Hess
(74) *Attorney, Agent, or Firm* — Fitch, Even, Tabin & Flannery LLP

(57) ABSTRACT

The present invention relates to a transportation system for transporting products in a transportation direction. The transportation system comprises a conveyor unit for transporting the products in the transportation direction from a first end of the conveyor unit towards a second end of the conveyor unit, and a drive unit for driving the conveyor unit. The drive unit comprises a drive means and a first magnetic clutch component for transmitting torque to the conveyor unit. The conveyor unit comprises a second magnetic clutch component for receiving torque from the drive unit. The transportation system further comprises supporting means which includes first and second supporting elements with the first supporting elements arranged at the drive unit and the second support elements arranged at the conveyor unit, for supporting the conveyor unit such that at least the first magnetic clutch component and the second magnetic clutch component are aligned to each other, and for supporting torque transmitted from the drive unit to the conveyor unit.

(Continued)

The present invention further relates to a drive unit as well as a conveyor unit, both adapted for use in a transportation system.

14 Claims, 5 Drawing Sheets

(51) Int. Cl.
    *A22C 11/00*     (2006.01)
    *F16D 27/02*     (2006.01)
    *B65G 21/06*     (2006.01)
    *B65G 23/18*     (2006.01)
    *B65G 15/00*     (2006.01)
    *B65G 21/10*     (2006.01)

(52) U.S. Cl.
    CPC .............. *B65G 23/18* (2013.01); *F16D 27/02* (2013.01); *F16D 27/12* (2013.01); *B65G 21/10* (2013.01); *B65G 2201/0202* (2013.01)

(58) Field of Classification Search
    USPC ................ 198/493, 619, 780, 788, 789, 805
    See application file for complete search history.

(56) References Cited

U.S. PATENT DOCUMENTS

| | | | | |
|---|---|---|---|---|
| 6,011,334 A | * | 1/2000 | Roland | H02K 7/11 |
| | | | | 290/43 |
| 6,349,818 B1 | * | 2/2002 | Spatafora | B65B 19/10 |
| | | | | 198/805 |
| 6,361,268 B1 | * | 3/2002 | Pelrine | B65G 54/02 |
| | | | | 104/284 |
| 6,510,941 B2 | * | 1/2003 | Schermutzki | B65G 15/62 |
| | | | | 198/493 |
| 6,528,908 B1 | * | 3/2003 | Lee | B65G 15/02 |
| | | | | 198/619 |
| 7,597,186 B2 | * | 10/2009 | Chung | G03G 15/6529 |
| | | | | 198/619 |
| 7,615,894 B1 | * | 11/2009 | Deal | B60L 11/1881 |
| | | | | 104/290 |
| 7,721,873 B2 | * | 5/2010 | Gauss | B65G 21/2009 |
| | | | | 198/690.1 |
| 8,807,331 B2 | * | 8/2014 | Beltman | B65G 23/44 |
| | | | | 198/806 |
| 9,150,366 B2 | * | 10/2015 | Rudick | B65G 54/025 |
| 9,446,902 B2 | * | 9/2016 | Aumann | B65G 17/32 |
| 9,688,473 B2 | * | 6/2017 | Reed | B65G 13/11 |

* cited by examiner

TRANSPORTATION SYSTEM WITH MAGNETIC CLUTCH

CROSS-REFERENCE TO RELATED APPLICATION

The present application claims the benefit of priority of European Patent Application No. 16167168.0 filed Apr. 26, 2016, the contents of which are incorporated herein by reference in their entirety.

FIELD

The present invention relates to a transportation system for transporting products in a transportation direction, which includes a conveyor unit for conveying products from a first end of the conveyor unit towards a second end of the conveyor unit in the transportation direction, and a drive unit for driving the conveyor unit. The transportation system further comprises a magnetic clutch for transmitting torque from the drive unit to the conveyor unit.

BACKGROUND OF THE INVENTION

Transportation systems which include a conveyor unit, are used in various fields for manufacturing products, e.g. in the production of sausage-shaped products. In this specific application, a transportation system is arranged subsequent to an apparatus for producing sausage-shaped products, like a filling and clipping machine combination. The transportation system acts as a discharge device for discharging sausage-shaped products, like sausages, from a discharge end of the clipping machine to a handling device for a further handling of said sausage-shaped products.

In the production of sausage-shaped products, like sausages, a filling material is fed by a filling machine through a filling tube of the clipping machine into a tubular casing material. After a predetermined volume of filling material has been filled into said tubular casing material, the clipping machine closes the back end of the sausage-shaped product via a closing means, like closure clips, which are attached by respective closing tools. A suspension element, like a suspension loop, may also be attached to said back end of said sausage-shaped product, enabling the sausage-shaped product to be hung up e.g. on a smoking rod or the like. Afterwards, the sausage-shaped product just produced, is separated from the remaining casing material by a knife or the like of a cutting device of the clipping machine and is transferred out of the clipping machine to a handling device for the next treatment step or a storage device by a respective transportation system or discharge device.

A discharge device for discharging sausages out of a clipping machine is known from EP patent application 1 744 636. Said known discharge device includes a conveyor unit in the form of a belt conveyor comprising a conveyor belt wound about two pulleys each arranged at one end of the belt conveyor. For driving the belt conveyor, an electric motor is provided, that drives that pulley which is arranged at the end of the belt conveyor facing towards the clipping machine.

From DE laid open document 102 03 457, a system for driving belt conveyors is known wherein a number of identically designed belt conveyors acting as buffering means are provided. A common drive means for driving the belt conveyors includes a first magnetic component and each of the belt conveyors comprises a second magnetic component. The belt conveyors are arranged at a guidance along which they can be shifted relative to the drive means such that a single belt conveyor can be arranged opposite the drive means for driving said single belt conveyor.

These known transportation devices enable the transport of a respective product in a transportation direction on a respective conveyor. However, in case that products of varying size, e.g. with regard to their diameter, length and/or weight, have to be conveyed, various problems may arise. In the case that products of larger diameter or greater length have to be transported, said products may exceed the conveyor belt and may thus be damaged. In case that products of a much higher weight must be handled, the drive of the conveyor may have insufficient power for transporting the products. Accordingly, a transport is not possible, or, in adaption to the varying products, the whole transportation device must constructively be amended.

Thus, it is an object of the present invention to provide a transportation system which overcomes the above mentioned drawbacks. It is a further object of the present invention to provide a transportation system of a compact design, which enables the transport of a great variety of products.

SUMMARY OF THE INVENTION

According to the present invention, there is provided a transportation system for transporting products in a transportation direction. The transportation system comprises at least a conveyor unit for transporting products in the transportation direction from a first end of the conveyor unit towards a second end of the conveyor unit, and a drive unit for driving the conveyor unit. The drive unit comprises drive means and a first magnetic clutch component for transmitting torque to the conveyor unit. The conveyor unit comprises a second magnetic clutch component for receiving torque from the drive unit. The transportation system further comprises supporting means which include first and second supporting elements with the first supporting elements arranged at the drive unit and the second support elements arranged at the conveyor unit for supporting the conveyor unit such that at least the first magnetic clutch component and the second magnetic clutch component are aligned to each other, and for supporting torque transmitted from the drive unit to the conveyor unit.

This design allows to provide a modular concept for a transportation system. In particular, the drive unit forms the basic component to which several different conveyor units as modules can reversibly be mounted. Thus, the transportation system can easily be adapted for different needs which arise from the different products to be conveyed. Simultaneously, it enables a compact design by a direct attachment of the at least one conveyor unit to the drive unit.

In a preferred embodiment, the supporting means are adapted for tool less reversible mounting or attachment of the conveyor unit to the drive unit. The possibility to reversibly mount a conveyor unit to the drive unit without the need of tools allows a quick and easy exchange of one conveyor unit against another one. Here, the fixture of the conveyor unit to the drive unit can be achieved by the magnetic clutch components of the drive unit and the conveyor unit. Thereby, the supporting means avoid a turning of the conveyor unit during a torque transmission between the drive unit and the conveyor unit. If desired, at least one additional tool as fixture can be provided such a snap-action device or a clamping device etc.

In order to realize a tool less mounting/demounting of the conveyor unit to or from the drive unit, the supporting means may be provided with guiding elements or may be designed as guiding elements. The guiding elements can have corresponding structures or shapes, like tongues and corresponding grooves, or a dovetail guide.

In an advantageous design, the first supporting elements being provided with the drive unit, are bolts and the second supporting elements being provided with the conveyor unit, are holes having a cross-section allowing the mounting of the conveyor unit with its second supporting elements to the first supporting elements of the drive unit. In a simple embodiment, the bolts and the holes have a circular cross-section with corresponding diameters. For mounting or demounting the conveyor unit to or from the drive unit, the conveyor unit may easily be shifted onto the bolts or pulled thereof. It has to be understood that the bolts and the holes may have any suitable cross-section, including different cross-sections, to enable an insertion of the bolts into the holes for mounting or demounting the conveyor unit to or from the drive unit.

It is further of advantage that the supporting means are adapted to align the drive unit and the conveyor unit to each other. This alignment may be realized by identically position the first and second supporting elements of the supporting means of the drive unit and the conveyor unit relative to the magnetic clutch components of the drive unit and the conveyor unit.

The first supporting elements of the supporting means can extend from the front side of the drive unit which is the side facing towards an operator, and the second supporting means are arranged at the rear side of the conveyor unit facing away from the operator who stands in front of the transportation system during a regular use or a regular operation of the transportation system. In this composition, the drive unit and the conveyor unit are arranged laterally to each other or side by side.

The transportation system, and in particular, the conveyor unit, has to be placed in a defined position relative to an apparatus which is arranged upstream of the transportation system or the conveyor unit and which delivers the products to be conveyed. Thus, in a further preferred embodiment of the transportation system, the second supporting elements are arranged at a predefined distance from the first end of the conveyor unit. The first end of the conveyor unit faces in upstream direction and its second end faces in downstream or transportation direction. Thereby, a correct alignment of the conveyor unit and the upstream arranged apparatus is ensured independent from the length of the conveyor unit.

The magnetic clutch with a first clutch component at the drive unit and a second clutch component on the conveyor unit, on the one hand provides a torque transfer from the drive unit to the conveyor unit. On the other hand, the first and the second magnetic clutch components may additionally retain the drive unit in its operating position in which the conveyor unit is mounted to the drive unit as already mentioned above. Thereby, any further retaining or securing means may be omitted.

Additionally, and for preventing accidental removal of the conveyor unit, i.e. by a transport vehicle, like a forklift, moved along the transportation system, a securing mechanism may be provided, like a securing ring, a bolt or a snap fit.

The magnetic clutch may be of any suitable design. In a preferred embodiment, the first magnetic clutch component includes a first magnetic disc, and the second magnetic clutch component includes a second magnetic disc corresponding to the first magnetic disc of first magnetic clutch component, in particular, in its diameter. The magnetic discs provide a force fit torque transmission from the drive unit to the conveyor unit, without the need of any space consuming form fitting elements. Furthermore, using circular components for the rotating elements may prevent unnecessary unbalances.

The transportation system according to the present invention may be used for transporting various products in a transportation direction. In a particular embodiment, the transportation system is a discharge device for discharging sausage-shaped products, like sausages, out of an apparatus for producing sausage-shaped products, like a clipping machine.

According to the present invention, there is further provided a drive unit for use in the inventive transportation system. The drive unit comprises drive means and a first magnetic clutch component for transmitting torque to a conveyor unit which includes a second magnetic clutch component. The drive unit further comprises first supporting elements for supporting the conveyor such that at least the first magnetic clutch component of the drive unit and the second magnetic clutch component of the conveyor unit are aligned to each other, and for supporting torque transmitted from the drive unit to the conveyor unit. The specific composition of the drive unit supports the compact design of the inventive transportation system.

In an advantageous embodiment, the drive unit includes adjustment means for adjusting the position of the drive means and/or the first supporting elements. By adjusting the position of the first supporting elements of the drive unit, which carries the conveyor unit, the position of the conveyor unit relative to a preceding apparatus, like an apparatus producing the products to be conveyed, may be adjusted. Moreover, by adjusting the position of the drive means, the position of the clutch components of the drive unit and a conveyor unit may be aligned relative to each other.

In a further advantageous embodiment, first adjustment means are provided for adjusting the height of the drive means and/or the first supporting elements, and second adjustment means are provided for adjusting the horizontal position of the drive means and/or the first supporting elements. Thereby, the position of the conveyor unit relative to the preceding apparatus, like an apparatus producing the products to be conveyed, may precisely be adjusted.

In a specific design, the drive unit comprises a first frame work and a second frame work which carries at least the first supporting elements and which is reversibly movable relative to the first frame work by the adjustment means, whereby a reliable adjustment of at least the first supporting elements is enabled.

It is further of advantage that the drive unit comprises an attachment unit for attaching the drive unit to an apparatus delivering the products to be conveyed. Said apparatus may also be an apparatus for producing the products to be conveyed or transported, like an apparatus for producing sausage-shaped products. Such an attachment unit may securely couple the drive unit to a preceding apparatus. Additionally, depending on its specific design, the attachment unit may include at least a portion of a hinge for pivoting the drive unit relative to said preceding apparatus, e.g. for facilitating maintenance or cleaning.

The drive unit can also be designed such that it can easily be mounted or demounted to or from a machine at which the inventive transportation system shall be used. The reversible mounting of the drive unit can be done with or without the need of tools. In the latter case, the modular design of the inventive transportation system is further developed such that the whole transportation system forms a module for a machine at which the transportation system shall be used. The tool less mounting/demounting of the transportation system can, for example, be carried out by providing a predefined mounting/demounting interface between the transportation system and the machine at which the system shall be used. This interface can be designed such that the transportation system is provided with a coupling element which can, for example, be a bar and which extends, for example, in a vertical direction, and the machine is provided with a corresponding coupling element which can, for example, be a hole. Moreover, the interface can be provided with a clamping device in order to fix the position of the transportation system after its mounting to the machine. Furthermore, connector elements can be provided for connecting the drive means of the transportation system with an energy source. It has to be noted that this modular character of the transportation system can be independent from the other inventive design solutions described above and below of this paragraph.

Further, in accordance with the present invention, there is provided a conveyor unit for use in the inventive transportation system for transporting products in a transportation direction from a first end of the conveyor unit towards a second end of the conveyor unit. The conveyor unit comprises at least one conveyor element, a second magnetic clutch unit for receiving torque from a drive unit for driving the conveyor unit which includes a first magnetic clutch component, and second supporting elements for supporting the conveyor unit such that at least the second magnetic clutch component of the conveyor unit and the first magnetic clutch component of the drive unit are aligned to each other, and for supporting torque transmitted from the drive unit to the conveyor unit. The specific composition of the conveyor unit supports the compact design of the inventive transportation system.

The conveyor unit may be of any suitable design, and may include any suitable conveying elements, like one or more conveyor belts or one or more conveyor chains. In one embodiment, the conveyor unit comprises at least one first pulley arrangement with at least one pulley, at least one second pulley arrangement with at least one pulley and at least one conveyor element guided around said first and second pulleys. The conveyor unit further comprises a torque transmission device for transmitting torque received from the drive unit by the second magnetic clutch component to one of the at least one first and second pulley arrangements. The torque transmission device may function as a gear which enables an adaption of the speed of the conveyor device.

By means of a torque transmission device which is not directly arranged on one of the axles of the first and second pulleys, each one of said axles of the first and second pulley arrangements may be driven. However, it is preferred that the axle of the second pulley arrangement facing in the transportation direction, is driven, whereby the load span is pulled in transportation direction.

Furthermore, the torque transmission device enables to arrange the second magnetic clutch component in a defined position relative to the second supporting elements and in nearly any position between the first and second pulley arrangements, as well as independently from the distance between the first and second pulley arrangements. Thereby, conveyor units having different lengths may be used with the drive unit.

In order to facilitate maintenance or cleaning of the conveyor unit, the conveyor unit further comprises a release mechanism for reversibly releasing the conveyor element from the conveyor unit. Preferably, the mounting and demounting of the conveyor element can also be done without the need of tools, for example, by relaxing the tension of the conveyor element by means of a shifting of one of the pulleys.

For further enabling a sure transport of the products to be conveyed, and for adapting the conveyor unit to the size of said products, the conveyor unit may further comprise guide means arranged along the upper run or load span of the conveyor element.

The guide means may be realized by guide bars or guide rails which may reversibly be mounted in different positions along the conveyor element, and in different distances to each other, e.g. to adjust the position of the product on the conveyor element.

Further advantages and preferred embodiments of the present invention will be described in the following together with the drawings listed below. The expressions "left", "right", "below" and "above" used in the following description, are referred to the drawings in an alignment such that the reference numbers and the notation of the figures used can be read in normal orientation.

DETAILED DESCRIPTION

Figure 1:
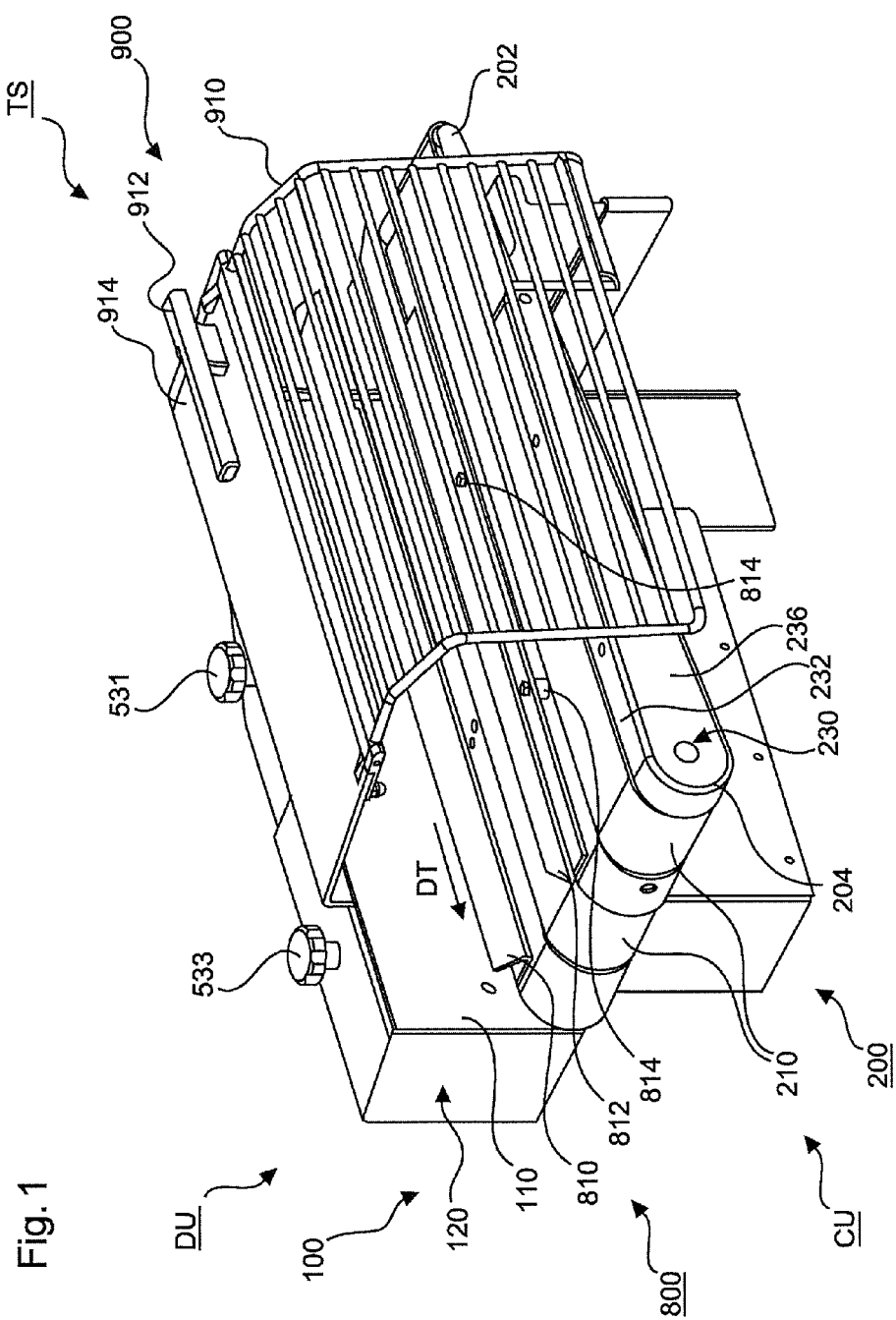
FIG. 1: is a schematic and perspective view to the front side of a transportation system according to the invention.
Figure 2:
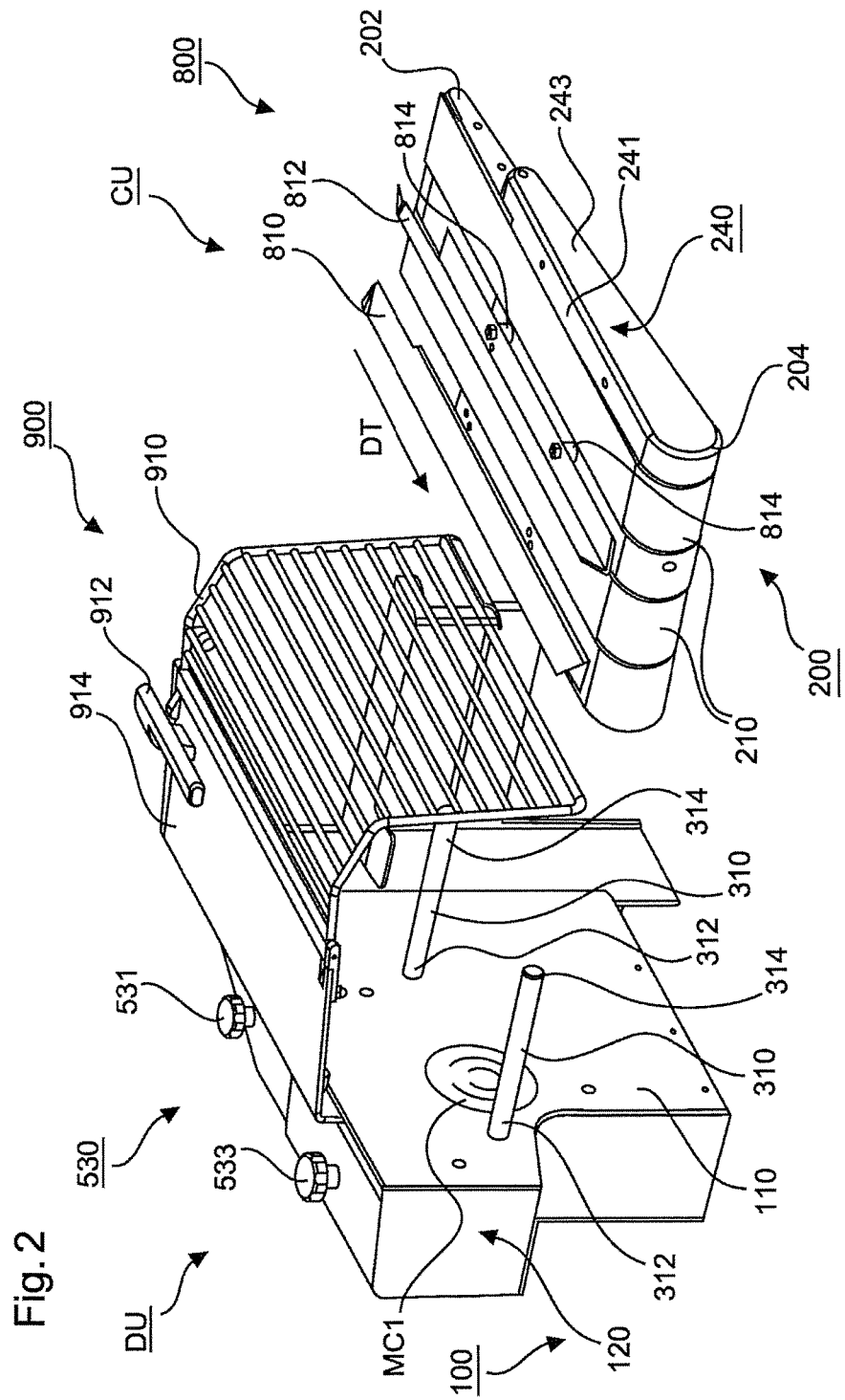
FIG. 2: is a schematic and perspective view to the front side of the transportation system of FIG. 1 with the conveyor unit disassembled from the drive unit.
Figure 3:
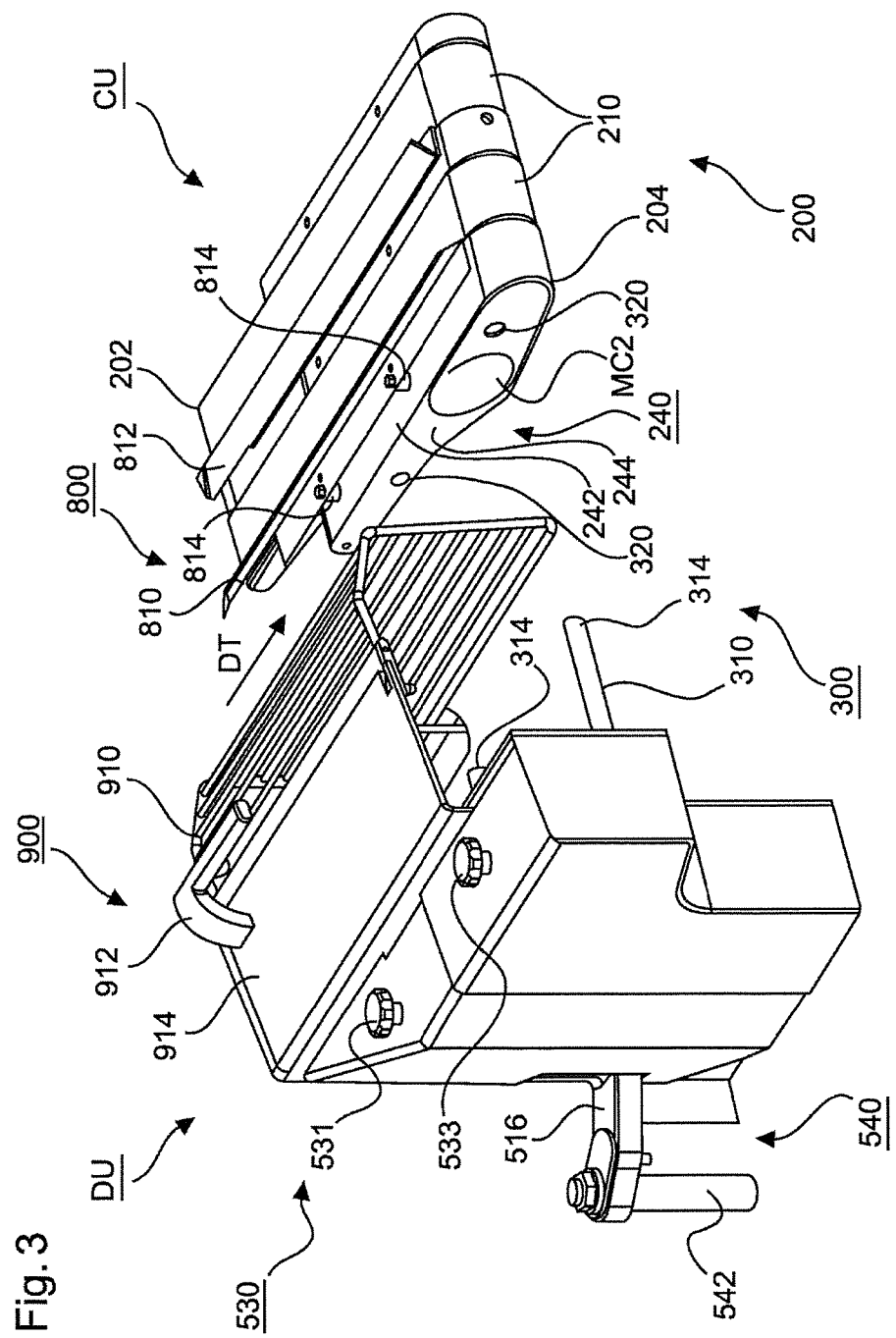
FIG. 3: is a schematic and perspective view to the rear side of the transportation system as shown in FIG. 2.

A transportation system TS according to the present invention comprises a drive unit DU and a conveyor unit CU, as shown in FIGS. 1 to 3. Drive unit DU and conveyor unit CU are at least approximately arranged side by side in a horizontal orientation. Preferably, they are in close contact with each other.

As best seen in FIG. 2, drive unit DU includes a housing 100 having an approximately planar front side 110 with a front side surface being oriented to conveyor unit CU, and a coverage 120 covering the rear side, the top side as well as the left and right sides of drive unit DU.

Figure 5:
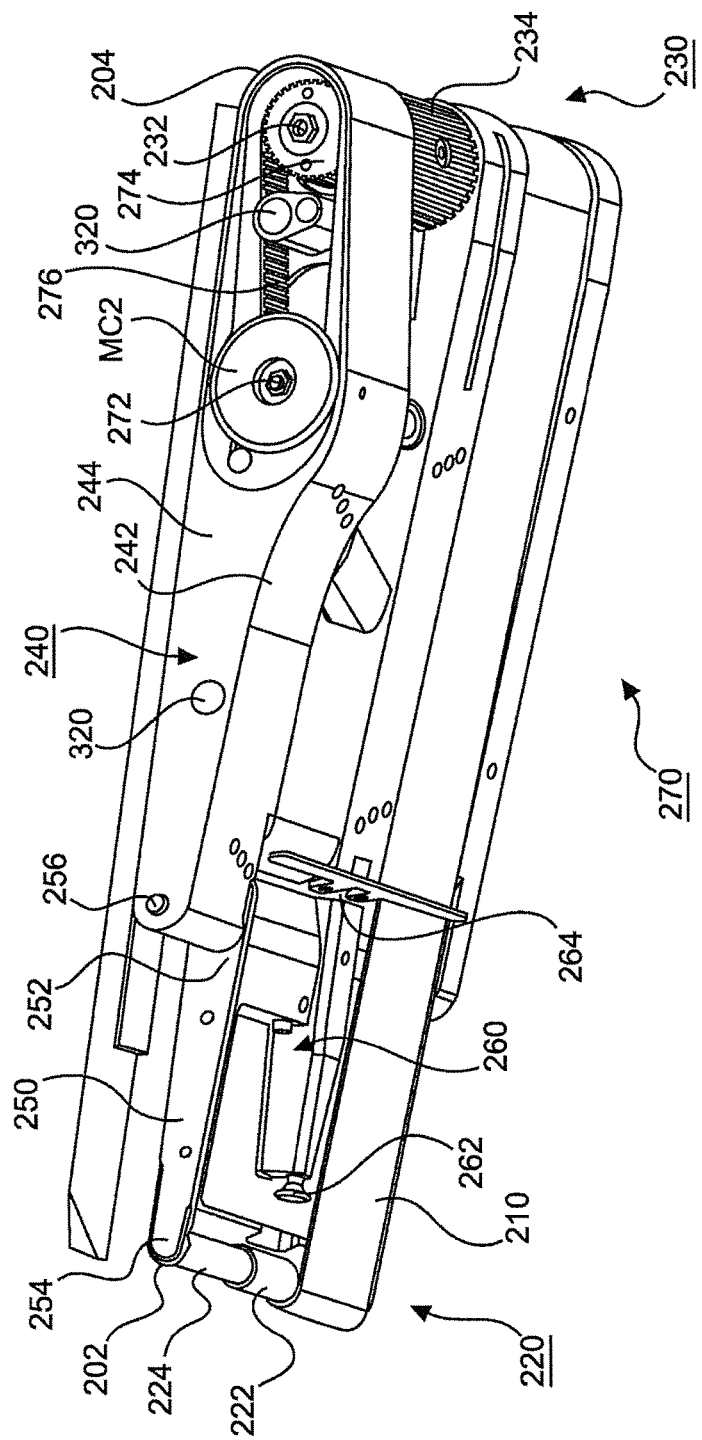
FIG. 5: is a schematic and perspective view to the lower side of the conveyor unit of the transportation system of the present invention.

Conveyor unit CU has a conveyor device 200 for conveying the products to be transported by transportation system TS in a transportation direction DT with two conveyor elements 210 in the form of conveyor belts which are wound about a first pulley arrangement 220 forming a first end 202 of conveyor unit CU, and a second pulley arrangement 230 forming a second end 204 of conveyor unit CU (cf. FIG. 5). Conveyor device 200 comprises a main body 240 which has an upper side 241 supporting the load span of conveyor elements 210, a bottom side 242, a front side 243 and a rear side 244. Main body 240 carries second pulley arrangement 230 (cf. FIG. 2, 5).

Transportation system TS further comprises supporting means 300 which include first supporting elements 310 and second supporting elements 320, as can be seen in FIGS. 2 and 3.

First supporting elements 310 are realized by two bolts having preferably a cylindrical shape. Naturally, bolts 310 may have any other suitable cross-section than a circular cross-section, like a rectangular, triangular or oval cross-section. First supporting elements or bolts 310 have first ends 312 with which bolts 310 are mounted or fixed to front side 110 of housing 100 of drive unit DU, and free second ends 314. Bolts 310 are arranged horizontally and at least approximately parallel to each other with a predefined distance there between. Bolts 310 extend at least approximately vertically from front side 110 with free ends 314 facing towards conveyor unit CU.

Second supporting elements 320 are formed by receiving holes in main body 240 of conveyor unit CU, which extend into main body 240 from its rear side 244 (cf. FIG. 3). Second supporting elements or receiving holes 320 are aligned parallel to each other and in a horizontal plane, at least approximately parallel to upper side 241 of main body 240. The distance between receiving holes 320 corresponds to the distance between bolts 310. The depth of receiving holes 320 is at least identical to the length of bolts 310. In order to allow a close contact between rear side 244 of main body 240 of conveyor unit CU and front side 110 of housing 100 of drive unit DU, the depth of receiving holes 320 is at least slightly larger than the length of bolts 310.

The circular cross-section of receiving holes 320 corresponds to the circular cross-section of bolts 310, i.e. the inner diameter of receiving holes 320 is at least equal or greater to the outer diameter of bolts 310. It has to be understood that, in case that the cross-section of bolts 310 is not circular, like rectangular, triangular or oval, the cross-section of receiving holes 320 has a corresponding shape, namely a rectangular, triangular or oval shape of at least approximately identical size. It has to be noted that the term "identical" in this regard means that the size of the cross-section of bolts 310 and receiving holes 320 is selected such that bolts 310 may be shifted into receiving holes 320 without a clearance or with a minimum clearance there between. It has further to be understood that the cross-sections of bolts 310 and holes 320 may be different, i.e. bolts 310 may have a triangular or rectangular cross-section, whereas receiving holes 320 have a circular cross-section. Thus, bolts 310 may be inserted into receiving holes 320, so that conveyor unit CU is supported by bolts 310 such that it may not or almost not be canted about the longitudinal axis of bolts 310.

Figure 4:
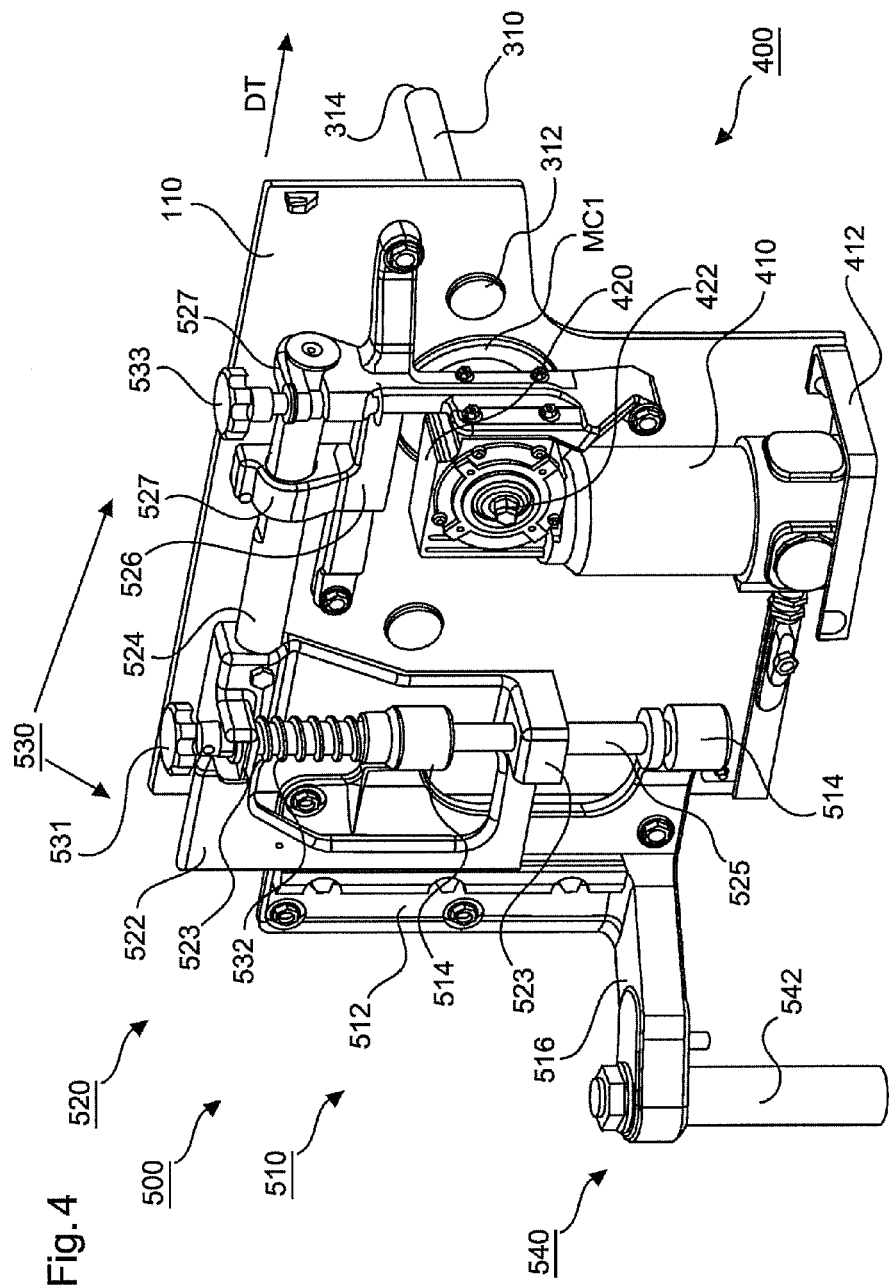
FIG. 4: is a schematic and perspective view to the rear side of the drive unit of the transportation system of the present invention with removed casing.

Drive unit DU, as it particularly can be seen in FIG. 4, comprises a drive means 400 including a motor 410, like an electric motor or any other suitable motor means, which is mounted to the inner side surface of front side 110 of housing 100 on a platform 412 facing to the rear side of drive unit DU such that coverage 120 covers drive means 400 (cf. FIGS. 1-3). Motor 410 of drive means 400 has a vertically arranged axle and a gear unit 420 mounted to the upper end of motor 410. Gear unit 420 comprises a driven shaft 422 which is arranged horizontally and approximately parallel to bolts 310 of supporting means 300.

As further can be seen in FIG. 4, a first magnetic clutch component MC1 is mounted to driven shaft 422 of gear unit 420. First magnetic clutch component MC1 has a circular shape and is arranged with its center at that end of driven shaft 422 that faces towards front side 110 of housing 100. Front side 110 has a circular opening corresponding in size to the circular shape of first magnetic clutch component MC1 which extends into the circular opening in front side 110, and which closes flush with front side 110 (cf. FIG. 2). First magnetic clutch component MC1 is arranged in a fixed position relative to first supporting elements or bolts 310 of supporting means 300.

First magnetic clutch component MC1 is positioned between first supporting elements or bolts 310 of supporting means 300, which enables a compact design of drive unit DU and transportation system TS. It has to be understood that first magnetic clutch component MC1 may also be positioned on either side of bolts 310, or in any other suitable position relative to bolts 310.

FIG. 5 shows a perspective view to rear side 244 of main body 240 of conveyor unit CU which is part of the rear side of conveyor unit CU. As can be seen in FIG. 5, a covering plate at second end of conveyor unit CU as well as one of conveyor belts 210 of conveyor device 200 has been omitted (cf. FIG. 3).

Conveyor device 200 for conveying the products in transportation direction DT comprises two conveyor elements or conveyor belts 210, from which, in FIG. 5, only one is shown. Conveyor belts 210 are wound about first pulley arrangement 220 at the first end 202 of conveyor unit CU, and second pulley arrangement 230 at second end 204 of conveyor unit CU.

Conveyor device 200 includes main body 240 at the downstream end of which second pulley arrangement 230 is positioned which forms second end 204 of conveyor unit CU. Conveyor device 200 further comprises a carrier frame 250 which is pivotally attached with its downstream end 252 to the upstream end of main body 240 by a pivot axle 256. Carrier frame 250 extends from main body 240 in upstream direction, i.e. the direction contrary to transportation direction DT. At its upstream end 254, first pulley arrangement 220 is positioned which forms first end 202 of conveyor unit CU.

First pulley arrangement 220 includes an axle (not visible) which is arranged at upstream end 254 of carrier frame 250. Said axle is aligned in a direction perpendicular to transportation direction DT and at least approximately horizontally, i.e. parallel to upper side 241 of main body 240. A pulley 222 is positioned and rotatably hold at said axle, and extends approximately over the complete width of conveyor device 200. For supporting both conveyor belts 210 of conveyor device 200, pulley 222 includes guide grooves 224 the width and depth of which corresponds to the width and thickness of conveyor belts 210.

At second end 204 of conveyor unit CU, second pulley arrangement 230 is provided, with a rotatable axle 232 extending through the downstream end of main body 240 and parallel to the axle of first pulley arrangement 220. On axle 232, two pulleys 234 are non-rotatable mounted, about each of which one of conveyor belts 210 of conveyor device 200 is wound. Pulleys 234 have a toothed outer surface corresponding to the toothed inner surface of conveyor belts 210, for enabling a slippage free drive of conveyor belts 210.

A release mechanism 260 is provided below carrier frame 250, which includes an actuator or control knob 262 and a locking mechanism which includes a locking pin 264. Release mechanism 260 enables or disables a pivot movement of carrier frame 250 about pivot axle 256, whereby an attachment or detachment of conveyor belts 210 to or from conveyor device 200 is enabled. For detaching conveyor belts 210 from conveyor device 200, in the situation shown in FIG. 5, control knob 262 is pulled in a direction contrary to transportation direction DT, and locking pin 264, and in particular, its right end, is pulled out of a locking hole (not shown) in the upstream end of main body 240. Pivot movement of carrier frame 250 about pivot axle 256 is possible, whereby conveyor belts 210 are slacked such that they can be removed from conveyor device 200. Furthermore, at least one other conveyor belt may be pushed onto conveyor device 200. Thereafter, carrier frame is pivoted back into the position shown in FIG. 5, and locking pin 264 may manually be shifted by control knob 262 into the locking hole in the upstream end of main body 240. Alternatively, locking pin 264 may automatically be shifted into the locking hole, e.g. when being spring loaded.

Conveyor unit CU further comprises a torque transmission device 270 for transmitting torque received from drive unit DU to second pulley arrangement 230. Torque transmission device 270 comprises an axle 272 rotatable arranged parallel to axle 232 of second pulley arrangement 230, and upstream thereto in main body 240. On axle 272, a first toothed wheel or pulley is arrange, which is not visible in FIG. 5. Torque transmission device 270 further comprises a second toothed wheel or pulley 274 arranged on axle 232 of second pulley arrangement 230, which is aligned with the not visible first pulley. A drive belt 276 with a toothed inner surface is wound about said first pulley and second pulley 274 of torque transmission device 270.

On that end of axle 272 of torque transmission device 270, facing towards rear side 244 of main body 240, a second magnetic clutch component MC2 is mounted. Second magnetic clutch component MC2 has a circular shape and is arranged with its center at axle 272. The coverage which is visible in FIG. 3 and which has been omitted in FIG. 5, has a circular cutout corresponding in size to the circular shape of second magnetic clutch component MC2 which extends into said circular cutout. Second magnetic clutch component MC2 closes flush with rear side 244 of main body 240 (cf. FIG. 3). Second magnetic clutch component MC2 is arranged in a fixed position relative to second supporting elements or receiving holes 320. As can be inferred from FIG. 5, by rotation of second magnetic clutch component MC2, conveyor belts 210 of conveyor device 200 may be driven.

First and second magnetic clutch components MC1, MC2 can be provided by magnetic discs which are preferably identical as to their geometrical dimensions and/or materials. In particular, both discs can be made from magnetic material.

As explained above, and as further can be seen in FIG. 5, conveyor unit CU comprises second supporting elements or receiving holes 320 which together with bolts 310 form supporting means 300. Receiving holes 320 extend into main body 240 from its rear side 244. Receiving holes 320 are aligned parallel to each other and in a horizontal plane at least approximately parallel to upper side 241 of main body 240. The distance between receiving holes 320 corresponds to the distance between bolts 310.

The upstream arranged receiving hole 320 is positioned between axle 256 of carrier frame 250 and second magnetic clutch component MC2; and downstream arranged receiving hole 320 is positioned between second magnetic clutch component MC2 and second pulley arrangement 230. Thereby, the over all length of conveyor unit CU may be reduced, and a compact design is enabled.

Drive unit DU further comprises a frame unit generally indicated by 500, with a first frame work 510 and a second frame work 520. First and second frame works 510, 520 are of a generally planar design, and are arranged approximately parallel to each other and approximately parallel to front side 110 of housing 100. First and second frame works 510, 520 extend from front side 110 towards the rear side of drive unit DU such that coverage 120 covers frame unit 500.

First frame work 510 has an approximately planar frame body 512 and is arranged at least approximately vertically and parallel to front side 110 of housing 100. Two receiving sleeves 514 are arranged at that vertical edge of first frame work 510 which faces towards drive means 400. Receiving sleeves 514 are oriented vertically above each other. At the vertical edge opposite to receiving sleeves 514, and in particular at its lower end, a protrusion or cantilever 516 is arranged, extending approximately horizontally and in a rearward direction from first frame work 510.

At the free end of cantilever 516, a hinge bolt 542 is mounted, which, together with cantilever 516, forms an attachment unit 540 for attaching drive unit DU to an apparatus for producing the products to be conveyed by conveyor unit CU of transportation system TS. Accordingly, the apparatus for producing the products to be transported, like a clipping machine for producing sausage-shaped products, includes a counter portion to hinge bolt 542, which cooperates with hinge bolt 542 for attaching drive unit DU to said clipping machine. Attachment unit 540 thereby allows mounting drive unit DU in an exact position at the clipping machine, and a pivoting movement of drive unit DU, e.g. for maintenance or cleaning of the clipping machine, and further, a quick mounting/demounting of drive unit DU or transportation system TS to or from the clipping machine.

Second frame work 520 includes a first frame portion 522 of a generally planar design and being arranged approximately parallel to front side 110 of housing 100. First frame portion 522 includes two receiving sleeves 523 arranged vertically above each other and facing from first frame portion 522 towards the rear side of drive unit DU.

Second frame work 520 further includes a second frame portion 526 which has an approximately planar body by which second frame portion 526 is fixedly attached to front side 110 of housing 100. Two horizontally oriented receiving sleeves 527 are arranged at the upper edge of second frame portion 526.

A horizontally aligned bolt 524 is fixedly attached to the upper end of first frame portion 522 and extends parallel to front side 110 of housing 100, and towards second frame portion 526. Second frame portion 526 is coupled to first frame portion 522 via horizontally arranged bolt 524, as it will be explained in greater detail below.

First frame work 510 and first frame portion 522 of second frame work 520 are arranged such that receiving sleeves 514 of first frame work 510 and receiving sleeves 523 of first frame portion 522 are aligned vertically above each other, with the lower receiving sleeve 523 of first frame portion 522 positioned between receiving sleeves 514 of first frame work 510. First frame portion 522 of second frame work 520 is coupled to first frame work 510 by a vertically arranged coupling bolt 525 which extends trough receiving sleeves 514 of first frame work 510 and receiving sleeves 523 of first frame portion 522 of second frame work 520. Coupling bolt 525 is fixedly attached to first frame work 510, at least in axial direction, with its lower end received in lower receiving sleeve 514. First frame portion 522 of second frame work 520 may vertically reversibly shifted along coupling bolt 525. For adjusting the vertical position of first frame portion 522 of second frame work 520 relative to first frame work 510, and for fixing first frame portion 522 in the selected position, an adjustment knob 531 is arranged at upper end of coupling bolt 525.

For moving first frame portion 522 of second frame work 520 along coupling bolt 525, coupling bolt 525 may comprise an external thread portion which engages an internal thread portion in upper receiving sleeve 523 of first frame portion 522. By rotating coupling bolt 525 via adjustment knob 531, first frame portion 522 of second frame work 520 may be shifted along coupling bolt 525 relative to first frame work 510. A spring element 532, like a coiled spring, arranged on coupling bolt 525 and between the upper receiving sleeves 514, 523 of first frame work 510 and first frame portion 522 of second frame work 520, supports the movement of first frame portion 522 along coupling bolt 525.

It has to be understood that other elements than threads may be used for moving first frame portion 522 of second frame work 520 along coupling bolt 525 and securing it in the selected position, like clamping elements which may be loosened for enabling movement of first frame portion 522 and which may be fastened for fixing first frame portion in the selected position.

Second frame portion 526 is coupled to first frame portion 522 via receiving sleeves 527 which are shifted onto horizontally arranged bolt 524 of first frame portion 522. Second frame portion 526 may reversibly be shifted in transportation direction DT along bolt 524. For fixing second frame portion 526 in a selected position on bolt 524, one of receiving sleeves 527 is designed as a clamping sleeve which may be loosened or fastened by a clamping screw 533.

As can be seen in FIGS. 2 and 4, front side 110 of housing 100 with first supporting elements or bolts 310, is mounted to second frame portion 526 of second frame work 520. Moreover, motor 410 is mounted to front side 110 via platform 412 at its lower end, and is further coupled to second frame portion 526 of second frame work 520 via gear unit 420. Thus, while shifting second frame portion 526 along horizontally bolt 524, also front side 110, and particularly, second supporting elements or bolts 310 may reversibly shifted in transportation direction DT, for adjusting the horizontal position of conveyor unit CU supported on supporting elements 310.

As can be seen in FIGS. 1 to 3, conveyor unit CU further includes a guide device 800 arranged at the upper side of conveyor unit CU. Guide device 800 comprises a first guide bar 810 and a second guide bar 812 which are formed by an angled sheet metal, and which are mounted to main body 240 by mounting screws 816. In FIGS. 1 to 3, first and second guide bars 810, 812 are mounted on the opposite sides of on of conveyor belts 210. In order to adapt guide device 800 to various products which may be transported on transportation system TS, and particularly to their width, additional mounting holes are provided for positioning first and second guide bars 810, 812 in other configurations, e.g. on the opposite sides of the other conveyor belt 210, or on different sides of both conveyor belts, or to mount additional guide bars to conveyor unit CU.

Furthermore, a protection device 900 which at least partially covers conveyor unit CU, is provided, e.g. for preventing an operator from gripping into conveyor unit CU and into the machine at which transportation system TS is mounted. Protection device 900 includes a protective grid 910 which covers the region immediately above conveyor device 200, and which may be pivoted up and backwards by a handle 912. A horizontally arranged cover plate 914 extends from the upper end of front side 110 of housing 100 at least partially over conveyor unit CU. At the front most corner of cover plate 914, protective grid 910 is pivotally mounted.

In operation, e.g. in the case that transportation system TS is used as a discharge device for discharging sausage-shaped products, like sausages, out of an apparatus for producing sausage-shaped products, like a clipping machine, transportation system TS is arranged at the output side of said clipping machine by means of attachment unit 540 with first end 202 close to the output opening or output region of the clipping machine. In the specific embodiment of FIGS. 1 to 5, attachment unit 540 includes hinge bolt 542 which cooperates with a respective counter portion on the clipping machine.

The sausage-shaped products or sausages produced by the clipping machine are received from first end 202 of conveyor unit CU and transported to its second end 204, where the sausages may be removed manually or automatically, for further treatment.

In order to avoid a gap between conveyor unit CU and the clipping machine, and thereby avoiding possible damage of the products to be transported, conveyor unit CU, and in particular, the horizontal position and the height of first end 202 of conveyor unit CU, may be adjusted relative to the output opening or output region of the clipping machine.

After transportation system TS has been attached to the clipping machine, the operator checks the position of conveyor unit CU, and particularly the position of second end 202 of conveyor unit CU relative to the clipping machine. In case that the height of conveyor unit CU is not correct, adjustment knob 531 of adjustment means 530 may be actuated, i.e. rotated, whereby first frame portion 522 of second frame work 520 together with second frame portion 526 coupled thereto by bolt 524, is vertically moved along coupling bolt 525 relative to first frame work 510. As explained above, front side 110 of housing 100 together and bolts 310 of supporting means 300 are mounted to second frame portion 526, and thus, they are vertically moved by actuating adjustment knob 531 for adjusting the height of conveyor unit CU.

Furthermore, the horizontal position of conveyor unit CU may be adjusted by loosening clamping screw 533 of adjustment means 530. Thereafter, front side 110 of housing 100 together with bolts 314 of supporting means 300 and conveyor unit CU supported thereon, may reversibly be shifted in transportation direction DT along bolt 524. After conveyor unit CU has reached its desired position, clamping screw 533 is fastened for securing conveyor unit CU in its position relative to the clipping machine.

Depending on the kind of sausage-shaped products to be produced, the conveyor unit CU already attached to drive unit DU may be used, and, first and second guide bars 810, 812 of guide device 800 may be mounted in respective positions on conveyor device 200.

In case that the size of the sausages varies, or in case that no conveyor unit CU is attached to drive unit DU, a conveyor unit CU is selected and mounted by supporting means 300 to drive unit DU. For attaching conveyor unit CU to drive unit DU, conveyor unit CU is shifted with receiving holes 320 onto bolts 310.

Due to the fact that receiving holes 320 and second magnetic clutch component MC2 are arranged in a configuration corresponding to that of bolts 310 and first magnetic clutch component MC1, first and second magnetic clutch components MC1, MC2 always match one another. Accordingly, when drive unit DU of transportation system TS is activated, torque from motor 410 is transmitted via gear unit 420, first magnetic clutch component MC1, second magnetic clutch component MC2 and torque transmission device 270 to second pulley arrangement 230 which drives conveyor belts 210 of conveyor unit 200.

When being attached to drive unit DU, conveyor unit CU is not only supported by support means 300, but also kept in its position on bolts 310 with rear side 244 of main body 240 lying against front side 110 of housing 100, by the magnetic force between first and second magnetic clutch components MC1, MC2 which are in close contact with each other.

Supporting means 300, on the one hand, allow a quick and easy attachment and detachment of conveyor unit CU to and from drive unit DU, just by shifting conveyor unit CU with receiving holes 320 onto bolts 31 of supporting means 300. Furthermore, by using a magnetic clutch for transmitting torque from drive unit DU to conveyor unit CU of transportation system TS, no additional connections between drive unit DU and conveyor unit CU for transferring drive energy, like an electrical, hydraulical or pneumatical connection, are necessary. Thereby, the effort of changing conveyor unit CU is reduced to a minimum.

On the other hand, supporting means 300, due to the identical position of bolts 310 at drive unit DU and receiving holes 320 in conveyor unit CU as well as the respective position of first and second magnetic clutch components MC1, MC2, enables a correct positioning of conveyor unit CU relative to drive unit DU. Additionally, support means 300 further provide torque support, for preventing unintentional movement of conveyor unit CU relative to drive unit DU without the need of any additional support arrangements, like racks or frames.

For removing conveyor unit CU from transportation system TS, conveyor unit CU is pulled from bolts 310 of supporting means 300, which may be done manually and without the use of any tools by the operator, whereby only the magnetic force acting between first and second magnetic clutch components MC1, MC2 has to be overcome.

Furthermore, due to the modular composition of transportation system TS, other conveyor units CU having different length or different widths may be coupled to and used with drive unit DU of transportation system TS. Thereby, other conveyor units CU can be provided with receiving holes 320 and a second magnetic clutch component MC2 of identical configuration corresponding to the configuration of bolts 310 and first magnetic clutch component MC1 of drive unit DU.

It is also possible to exchange drive unit DU by a different one, e.g. having a drive power different from current drive unit DU, e.g. in adaption to products of different weights to be transported. Said different drive unit DU only needs to be provided with bolts 310, a first magnetic clutch component MC1 and an attachment unit of identical configuration than current drive unit DU.

It has to be understood that the use of transportation system TS as a discharge device of a clipping machine is only exemplarily. Transportation system TS may be used for transporting a great variety of products, and can be combined with various apparatuses which may produce or only supply the products to be transported.

What is claimed is:

1. A transportation system for transporting products in a transportation direction, comprising:
    at least a conveyor unit for transporting the products in the transportation direction from a first end of the conveyor unit towards a second end of the conveyor unit, the conveyor unit having a main body including a rear side, and a drive unit for driving the conveyor unit, the drive unit having a housing including a front side,
    wherein the drive unit comprises drive means and a first magnetic clutch component for transmitting torque to the conveyor unit, and wherein the conveyor unit comprises a second magnetic clutch component for receiving torque from the drive unit, and further comprising:
    supporting means which include first and second supporting elements with the first supporting elements arranged at the drive unit and the second supporting elements arranged at the conveyor unit for supporting the conveyor unit such that at least the first magnetic clutch component and the second magnetic clutch component are aligned to each other, and for supporting torque transmitted from the drive unit to the conveyor unit,
    wherein the first supporting elements are bolts that extend at least approximately vertically from the front side of the housing with free ends facing towards the conveyor unit, and the second supporting elements are holes having a cross-section allowing the mounting to the first supporting elements, the holes extend into the rear side of the main body of the conveyor unit.

2. The transportation system according to claim 1, wherein the supporting means are adapted for tool less reversible mounting of the conveyor unit to the drive unit.

3. The transportation system according to claim 1, wherein the supporting means are adapted to align the drive unit and the conveyor unit to each other.

4. The transportation system according to claim 1, wherein the second supporting elements are arranged at a predefined distance from the first end of the conveyor unit.

5. The transportation system according to claim 1, wherein the first and the second magnetic clutch component retain the drive unit in its operating position.

6. The transportation system according to claim 1, wherein the first magnetic clutch component includes a first magnetic disc, and
    wherein the second magnetic clutch component includes a second magnetic disc corresponding to the first magnetic disc of first magnetic clutch component.

7. The transportation system according to claim 1, wherein the transportation system is a discharge system for discharging sausage-shaped products, like sausages, out of an apparatus for producing sausage-shaped products, like a clipping machine.

8. A drive unit for use in a transportation system, the drive unit having a housing including a front side, the drive unit comprising:
    drive means and a first magnetic clutch component for transmitting torque to a conveyor unit which includes a second magnetic clutch component, and further comprising:
    first supporting elements for supporting the conveyor unit such that at least the first magnetic clutch component and the second magnetic clutch component of the conveyor unit are aligned to each other, and for supporting torque transmitted from the drive unit to the conveyor unit,
    wherein the first supporting elements are bolts that extend at least approximately vertically from the front side of the housing with free ends facing towards a rear side of the conveyor unit for being mounted in holes in the rear side of the conveyor unit.

9. The drive unit according to claim 8, further comprising adjustment means for adjusting the position of the drive means and/or the first supporting elements.

10. The drive unit according to claim 9,
wherein the drive unit comprises a first frame work and a second frame work which carries at least the first supporting elements, and which is reversibly movable relative to the first frame work by the adjustment means.

11. The drive unit according to claim 8, further comprising an attachment unit for attaching the drive unit to an apparatus delivering the products to be conveyed.

12. A conveyor unit for use in a transportation system, the conveyor unit having a main body including a rear side, the conveyor unit for conveying products in a transportation direction from a first end of the conveyor unit towards a second end of the conveyor unit, comprising:
at least one conveyor element,
a second magnetic clutch component for receiving torque from a drive unit for driving the conveyor unit, the drive unit includes a first magnetic clutch component, and
second supporting elements for supporting the conveyor unit such that at least the second magnetic clutch component and the first magnetic clutch component of the drive unit are aligned to each other, and for supporting torque transmitted from the drive unit to the conveyor unit,
wherein the second supporting elements are holes having a cross-section allowing the mounting to first supporting elements extending from a front side of the drive unit, the holes extend into the rear side of the main body of the conveyor unit.

13. The conveyor unit according to claim 12,
comprising at least one first pulley arrangement with at least one pulley, at least one second pulley arrangement with at least one pulley, at least one conveyor element guided around said pulleys, and a torque transmission device for transmitting torque received from the drive unit by the second magnetic clutch component to one of the at least one first and second pulley arrangements.

14. The conveyor unit according to claim 13,
further comprising a release mechanism for reversibly releasing the conveyor element from the conveyor unit.

* * * * *